US012686334B2

(12) United States Patent
Tatsumoto et al.

(10) Patent No.: US 12,686,334 B2
(45) Date of Patent: Jul. 21, 2026

(54) BACKING ASSISTANCE APPARATUS AND VEHICLE

(71) Applicant: TOYOTA JIDOSHA KABUSHIKI KAISHA, Toyota (JP)

(72) Inventors: Yuki Tatsumoto, Seto (JP); Josuke Yamane, Nagoya (JP); Hirotaka Nogami, Nisshin (JP); Kazuya Nishimura, Anjo (JP); Takumi Fukunaga, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/976,333

(22) Filed: Dec. 11, 2024

(65) Prior Publication Data

US 2025/0196774 A1      Jun. 19, 2025

(51) Int. Cl.
B60R 1/26          (2022.01)
B60N 2/00          (2006.01)
G06V 20/58         (2022.01)

(52) U.S. Cl.
CPC ................ B60R 1/26 (2022.01); B60N 2/002 (2013.01); B60R 2300/806 (2013.01); G06V 20/58 (2022.01)

(58) Field of Classification Search
CPC .... B60R 1/26; B60R 2300/806; G06V 20/58; B60N 2/002; B60W 10/00; B60W 30/06
See application file for complete search history.

(56) References Cited

U.S. PATENT DOCUMENTS

| | | | | |
|---|---|---|---|---|
| 9,731,765 B2 * | 8/2017 | Yang | .................... | G08G 1/143 |
| 12,534,068 B2 * | 1/2026 | Yamaguchi | .......... | B60W 30/06 |

| | | | | |
|---|---|---|---|---|
| 2011/0006903 A1 * | 1/2011 | Niem | ..................... | G08B 21/06 |
| | | | | 340/576 |
| 2015/0057870 A1 * | 2/2015 | Lee | ........................ | B60W 30/06 |
| | | | | 701/23 |
| 2017/0229020 A1 * | 8/2017 | Colella | ................ | G06V 20/586 |
| 2018/0029591 A1 * | 2/2018 | Lavoie | ................. | B60W 50/14 |
| 2018/0093664 A1 * | 4/2018 | Kim | ..................... | B60W 40/10 |
| 2020/0086852 A1 * | 3/2020 | Krekel | ................. | B60W 50/14 |
| 2022/0335832 A1 | 10/2022 | Okubo et al. | | |

FOREIGN PATENT DOCUMENTS

| | | | | | |
|---|---|---|---|---|---|
| EP | 3343437 A2 * | 7/2018 | | ............ | B60R 25/10 |
| EP | 3343438 A1 * | 7/2018 | | .......... | G06V 10/757 |
| JP | 2008296639 A | 12/2008 | | | |
| JP | 2013063770 A | 4/2013 | | | |
| JP | 2019137079 A | 8/2019 | | | |
| JP | 2022164077 A | 10/2022 | | | |

OTHER PUBLICATIONS

Tang-Hsien et al., "Rear-end collision warning system on account of a rear-end monitoring camera," 2009, Publisher: IEEE.*

* cited by examiner

*Primary Examiner* — Tuan C To

(74) *Attorney, Agent, or Firm* — KENJA IP LAW PC

(57)          ABSTRACT

A backing assistance apparatus includes a controller configured to monitor a usage of each seat on a driver side and a passenger side of a vehicle, set a reference distance on each of the driver side and the passenger side according to the usage, and upon detecting an obstacle on a side of a space to which the vehicle is predicted to proceed when the vehicle is backing, display, on a screen that shows an image of a rear of the vehicle to assist in backing the vehicle, a guide element indicating a position that is distant from the detected obstacle by the reference distance.

5 Claims, 6 Drawing Sheets

*FIG. 4*

BACKING ASSISTANCE APPARATUS AND VEHICLE

CROSS-REFERENCE TO RELATED APPLICATION

This application claims priority to Japanese Patent Application No. 2023-212501 filed on Dec. 15, 2023, the entire contents of which are incorporated herein by reference.

TECHNICAL FIELD

The present disclosure relates to a backing assistance apparatus and a vehicle.

BACKGROUND

Patent Literature (PTL) 1 discloses an apparatus that displays on a display a video of the rear of a vehicle captured by a camera and a distance guide line indicating the position at a predetermined distance away from the vehicle in a superimposed manner to assist in the parking operation of the vehicle. PTL 2 discloses an apparatus that, upon detecting a vehicle before parking, determines the characteristics of the vehicle or the driver of the vehicle, sets a parking slot for the vehicle according to the characteristics, and transmits information indicating the parking slot to the vehicle.

CITATION LIST

Patent Literature

PTL 1: JP 2013-063770 A
PTL 2: JP 2022-164077 A

SUMMARY

The occupants of a vehicle may open and close the side door after parking in order to get out of the vehicle. Depending on the construction of the side door, the side door may contact an obstacle on the side of the vehicle when it is opened. To avoid such a situation, it is preferable to park at a certain distance from obstacles. However, conventional apparatuses cannot always assist in parking at an appropriate distance from obstacles on the side of the vehicle.

It would be helpful to enable drivers to more easily park at an appropriate distance from obstacles on the side of their vehicles.

A backing assistance apparatus according to the present disclosure includes a controller configured to:

monitor a usage of each seat on a driver side and a passenger side of a vehicle;

set a reference distance on each of the driver side and the passenger side according to the usage; and upon detecting an obstacle on a side of a space to which the vehicle is predicted to proceed when the vehicle is backing, display, on a screen that shows an image of a rear of the vehicle to assist in backing the vehicle, a guide element indicating a position that is distant from the detected obstacle by the reference distance.

According to the present disclosure, drivers can more easily park at an appropriate distance from obstacles on the side of their vehicles.

BRIEF DESCRIPTION OF THE DRAWINGS

In the accompanying drawings:

FIG. 4 is a diagram illustrating an example of a screen according to the embodiment of the present disclosure;

DETAILED DESCRIPTION

Figure 1:
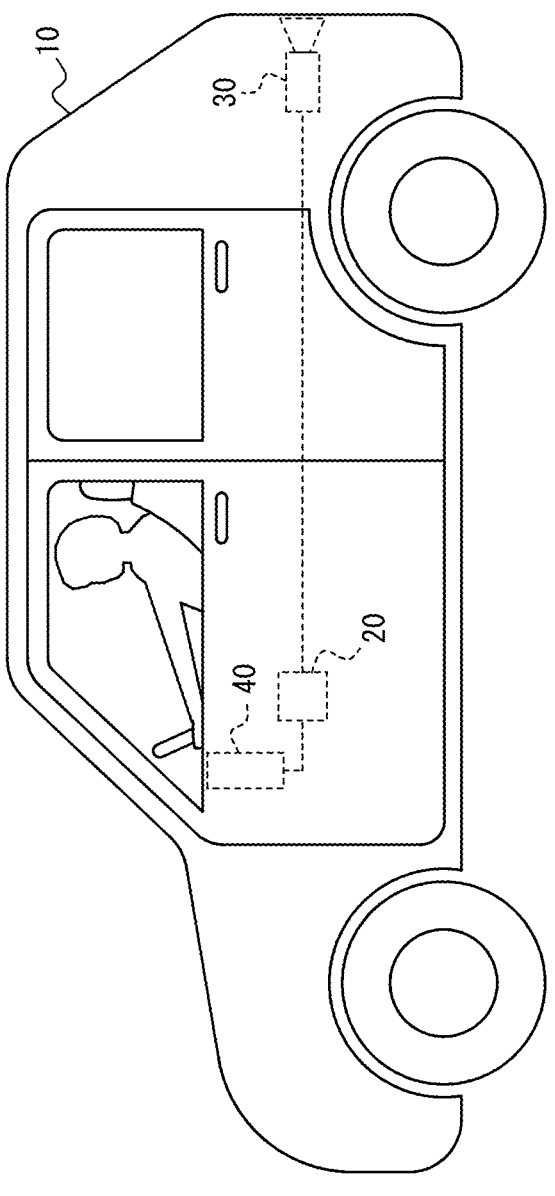
FIG. 1 is a diagram illustrating a configuration of a vehicle according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a vehicle 10 according to the present embodiment will be described with reference to FIG. 1.

The vehicle 10 is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 10 is driven by a driver, but the driving may be automated at any level. The automation level is, for example, any one of Level 1 to Level 4 according to the level classification defined by SAE. The name "SAE" is an abbreviation of Society of Automotive Engineers. The vehicle 10 may be a MaaS-dedicated vehicle. The term "MaaS" is an abbreviation of Mobility as a Service.

The vehicle 10 includes a backing assistance apparatus 20, a camera 30, and a display 40. The backing assistance apparatus 20 can communicate with the camera 30 and the display 40 via cable or a network such as CAN, or wirelessly. The term "CAN" is an abbreviation of Controller Area Network. The backing assistance apparatus 20 may be able to communicate with an external server, such as a cloud server, via a network such as the Internet.

The backing assistance apparatus 20 is a computer mounted on the vehicle 10. The camera 30 is a so-called rearview camera, specifically a video camera mounted at the rear of the vehicle 10. The display 40 is a so-called back monitor, specifically an LCD or an organic EL display mounted on the dashboard of the vehicle 10. Alternatively, the display 40 may be an LCD or an organic EL display mounted on the rearview mirror of the vehicle 10. Alternatively, the display 40 may be a HUD. The term "LCD" is an abbreviation of liquid crystal display. The term "EL" is an abbreviation of electro luminescent. The term "HUD" is an abbreviation of head-up display.

Figure 4:
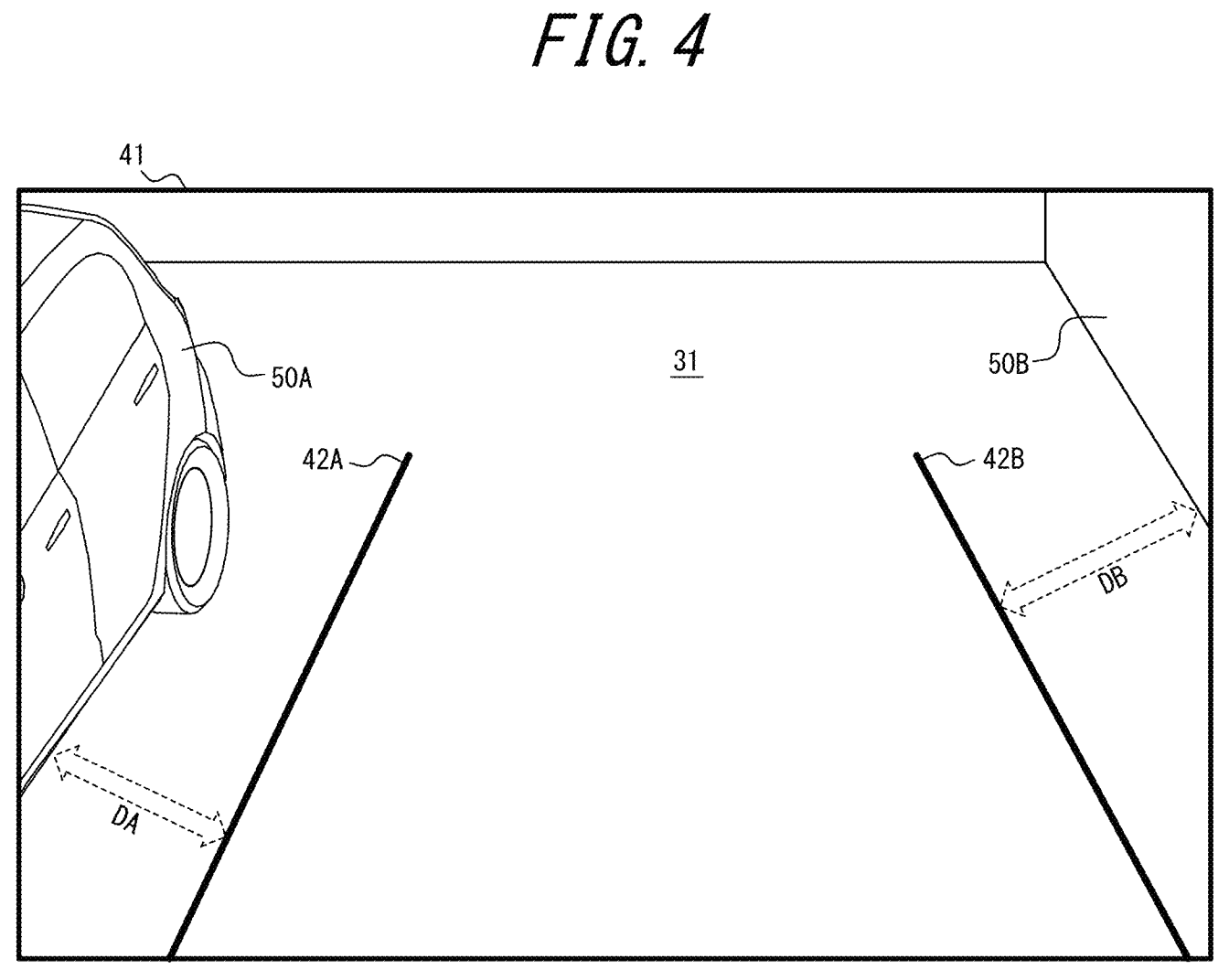

With reference to FIGS. 1 and 4, an outline of the present embodiment will be described.

The backing assistance apparatus 20 monitors the usage of each seat on the driver side and passenger side of the vehicle 10. For example, the backing assistance apparatus 20 monitors the usage of each of the driver seat, the passenger seat, the rear seat on the driver side, and the rear seat on the passenger side, respectively, of the vehicle 10.

Figure 2:
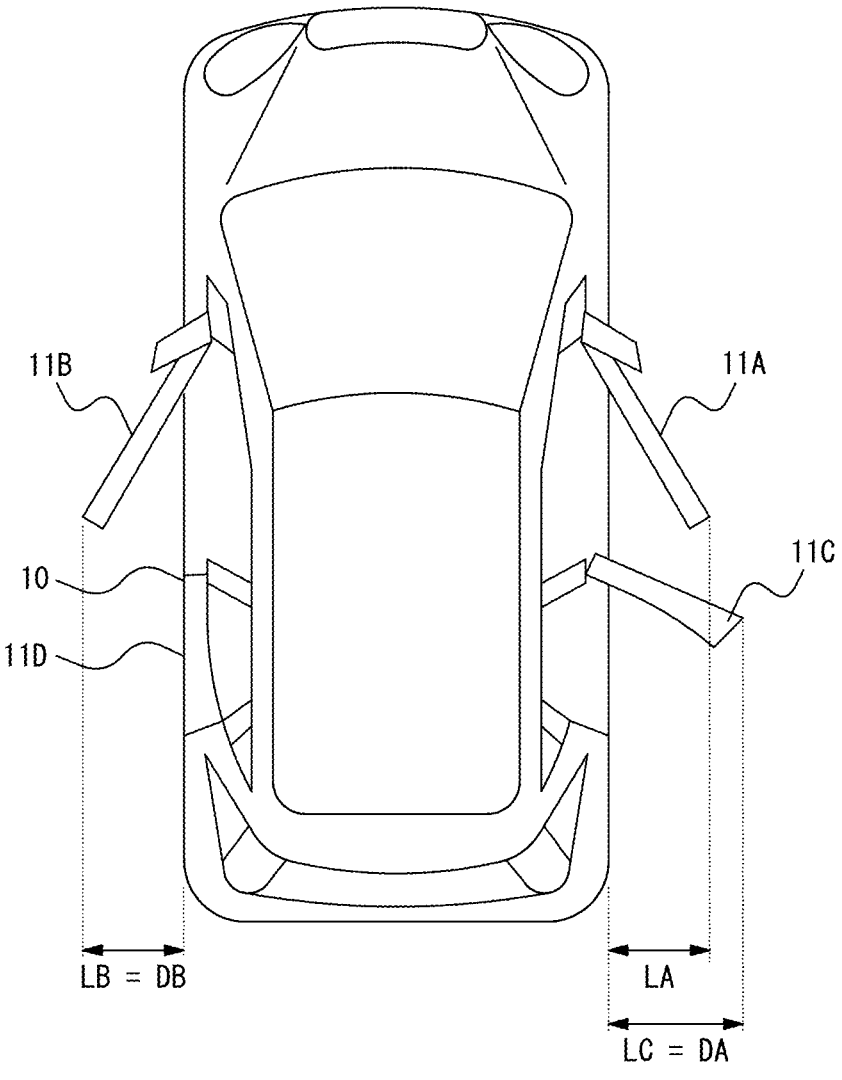
FIG. 2 is a diagram illustrating examples of reference distances according to the embodiment of the present disclosure.

As illustrated in FIG. 2, the backing assistance apparatus 20 sets the reference distance on each of the driver side and the passenger side, respectively, according to the usage of each seat. For example, upon detecting a situation in which a child is seated in the rear seat on the driver side, the backing assistance apparatus 20 sets a reference distance DA on the driver side based on a protruding length LA of the door 11A of the driver seat when having the minimum opening degree required for the driver to get out and a protruding length LC of the door 11C of the rear seat on the driver side when having the maximum opening degree. In the example illustrated in FIG. 2, since LA<LC, LC=DA, i.e., the reference distance DA on the driver side is set to the same distance as the protruding length LC. For example, upon detecting a situation in which an occupant is seated in the passenger seat and no occupant is seated in the rear seat on the passenger side, the backing assistance apparatus 20 sets a reference distance DB on the passenger side based on a protruding length LB of the door 11B of the passenger seat when having the minimum opening degree required for the occupant to get out. In the example illustrated in FIG. 2, LB=DB, i.e., the reference distance DB on the passenger side is set to the same distance as the protruding length LB.

Figure 3:
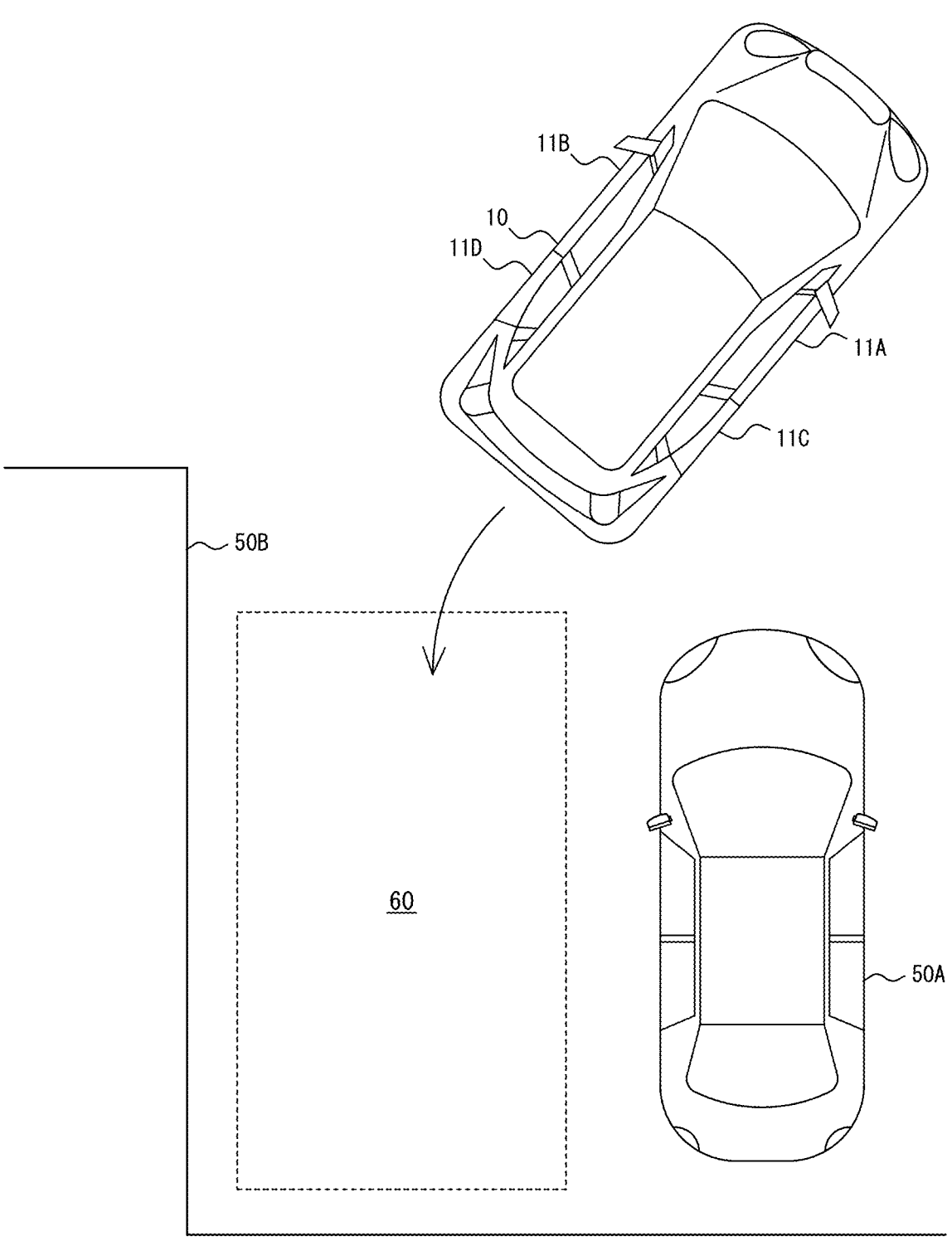
FIG. 3 is a diagram illustrating examples of obstacles according to the embodiment of the present disclosure.

As illustrated in FIG. 3, the backing assistance apparatus 20 determines whether there is an obstacle on the side of a space 60 to which the vehicle 10 is predicted to proceed when the vehicle 10 is backing. In the example illustrated in FIG. 3, the parked vehicle 50A is detected as an obstacle on the side of the space 60 corresponding to the driver side and the wall 50B is detected as an obstacle on the side of the space 60 corresponding to the passenger side.

As illustrated in FIG. 4, upon detecting the obstacle, the backing assistance apparatus 20 displays, on a screen 41 that shows an image 31 of the rear of the vehicle 10 to assist in backing the vehicle 10, a guide element indicating a position that is distant from the detected obstacle by the reference distance. The screen 41 is a back-view screen in the present embodiment, but it can also be a 360-degree view screen. In the example illustrated in FIG. 4, a guide line 42A is displayed as a guide element on the driver side, indicating a position that is distant from the parked vehicle 50A by the reference distance DA on the driver side, and a guide line 42B is displayed as a guide element on the passenger side, indicating a position that is distant from the wall 50B by the reference distance DB on the passenger side.

According to the present embodiment, the guide elements displayed on the screen 41 enable the driver to see a position that is distant from the obstacle on the side of the vehicle 10 by the reference distance. Thus, the drivers can more easily park at an appropriate distance from the obstacle. For example, it is easier to see how far away from the parked vehicle 50A to park in order to prevent the door 11C from contacting the parked vehicle 50A even if a child seated in the rear seat on the driver side opens the door 11C vigorously when getting out. If a child is in a child seat, it is easier to see how far away from the parked vehicle 50A to park in order to make it easier to remove the child from the child seat. It is also easier to see how far away from the wall 50B to park in order to prevent the door 11B from contacting the wall 50B when the occupant seated in the passenger seat gets out.

Figure 5:
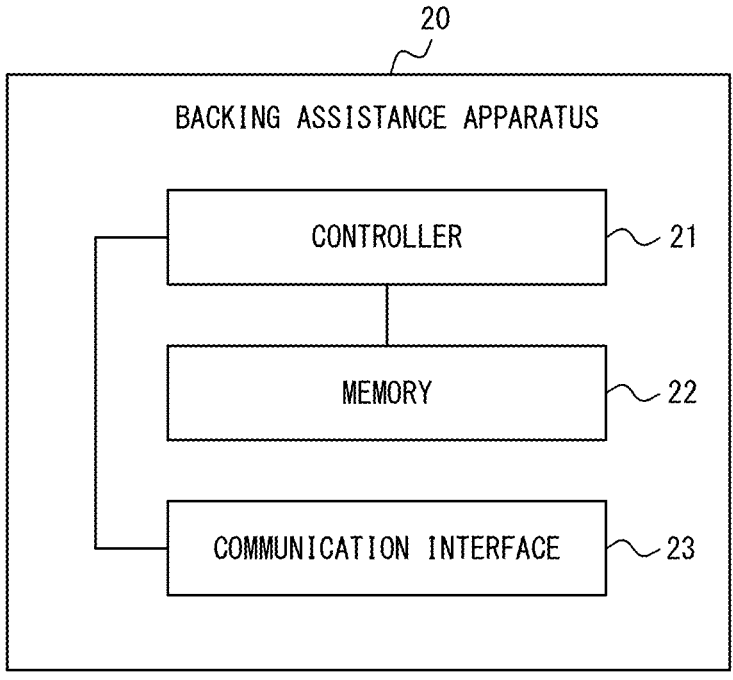
FIG. 5 is a block diagram illustrating a configuration of a backing assistance apparatus according to the embodiment of the present disclosure.

A configuration of the backing assistance apparatus 20 according to the present embodiment will be described with reference to FIG. 5.

The backing assistance apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the backing assistance apparatus 20 while controlling components of the backing assistance apparatus 20.

The memory 22 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 22 functions as, for example, a main memory, an auxiliary memory, or a cache memory. The memory 22 stores data to be used for the operations of the backing assistance apparatus 20 and data obtained by the operations of the backing assistance apparatus 20.

The communication interface 23 includes at least one communication module. The communication module is, for example, a module compliant with an in-vehicle communication standard such as CAN, a wired LAN communication standard such as Ethernet® (Ethernet is a registered trademark in Japan, other countries, or both), a wireless LAN communication standard such as IEEE 802.11, a mobile communication standard such as LTE, the 4G standard, or the 5G standard, or a short-range wireless communication standard such as Bluetooth® (Bluetooth is a registered trademark in Japan, other countries, or both). The term "LAN" is an abbreviation of local area network. The name "IEEE" is an abbreviation of Institute of Electrical and Electronics Engineers. The term "LTE" is an abbreviation of Long Term Evolution. The term "4G" is an abbreviation of 4th generation. The term "5G" is an abbreviation of 5th generation. The communication interface 23 receives data to be used for the operations of the backing assistance apparatus 20, and transmits data obtained by the operations of the backing assistance apparatus 20.

The functions of the backing assistance apparatus 20 are realized by execution of a program according to the present embodiment by a processor serving as the controller 21. That is, the functions of the backing assistance apparatus 20 are realized by software. The program causes a computer to execute the operations of the backing assistance apparatus 20, thereby causing the computer to function as the backing assistance apparatus 20. That is, the computer executes the operations of the backing assistance apparatus 20 in accordance with the program to thereby function as the backing assistance apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, the program stored in the portable medium or the program transferred from the server. Then, the computer reads the program stored in the main memory using the processor, and executes processes in accordance with the read program using the processor. The computer may read the program directly from the portable medium, and execute processes in accordance with the program. The computer may, each time a program is transferred from the server to the computer, sequentially execute processes in accordance with the received program. Instead of transferring the program from the server to the computer, processes may be executed by a so-called ASP type service that realizes functions only by execution instructions and result acquisitions. The term "ASP" is an abbreviation of application service provider. The program encompasses information that is to be used for processing by an electronic computer and is thus equivalent to a program. For example, data that is not a direct command to a computer but has a property that regulates processing of the computer is "equivalent to a program" in this context.

Some or all of the functions of the backing assistance apparatus 20 may be realized by a programmable circuit or a dedicated circuit serving as the controller 21. That is, some or all of the functions of the backing assistance apparatus 20 may be realized by hardware.

Figure 6:
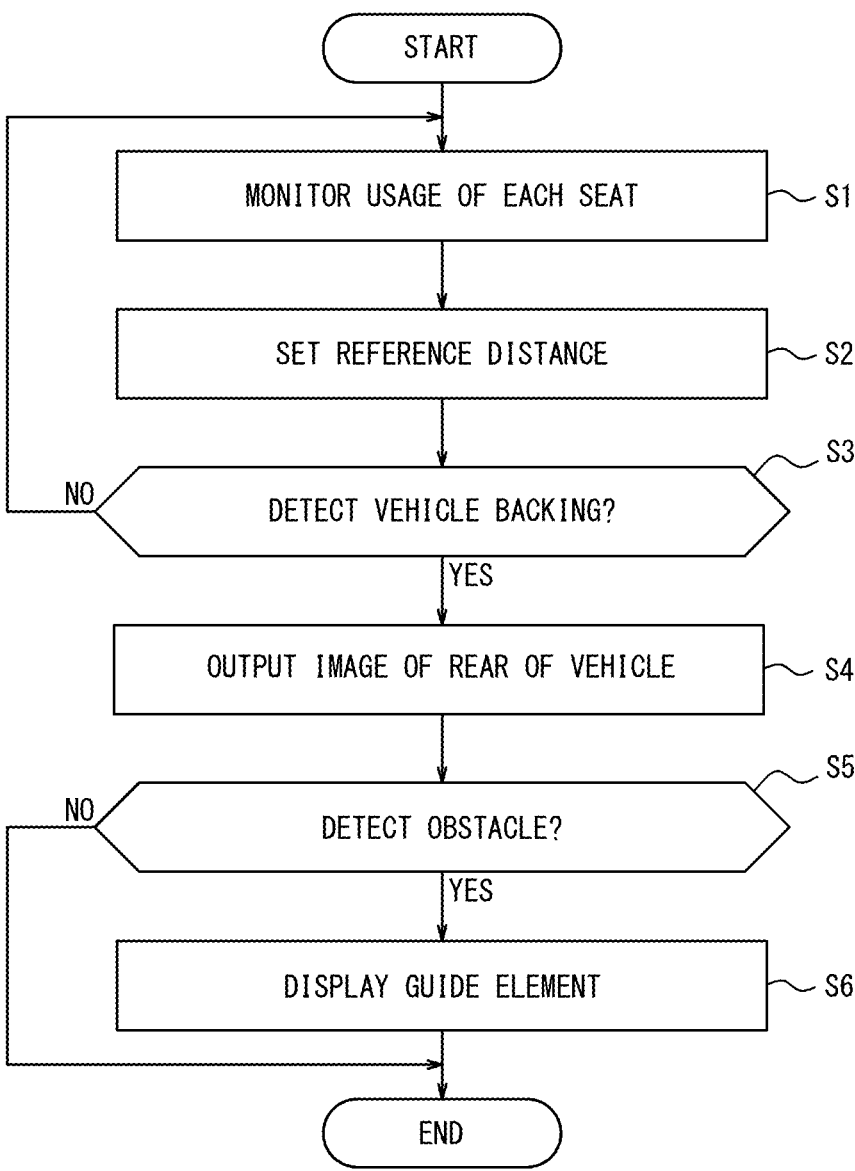
FIG. 6 is a flowchart illustrating operations of the backing assistance apparatus according to the embodiment of the present disclosure.

Operations of the backing assistance apparatus 20 according to the present embodiment will be described with reference to FIG. 6. The operations described below correspond to a backing assistance method according to the present embodiment. In other words, the backing assistance method according to the present embodiment includes steps S1 to S6 illustrated in FIG. 6.

In S1, the controller 21 monitors the usage of each seat on the driver side and the passenger side of the vehicle 10.

Specifically, if the vehicle 10 is a two-seater vehicle, the controller 21 monitors whether an occupant is seated in each of the driver seat and the passenger seat of the vehicle 10, respectively, as a usage, using an in-vehicle camera or seating sensors. The controller 21 may use an in-vehicle camera or seating sensor to monitor whether luggage is placed in the passenger seat.

In a case in which the vehicle 10 is a four-seater or five-seater vehicle, the controller 21 monitors whether an occupant is seated in each of the driver seat, the passenger seat, the rear seat on the driver side, and the rear seat on the passenger side of the vehicle 10, as a usage, using an in-vehicle camera or seating sensors. The controller 21 may further monitor with an in-vehicle camera or seating sensor whether an occupant is seated in the center of the rear seat. The controller 21 may use an in-vehicle camera or seating sensors to monitor whether luggage is placed in each of the driver seat, the passenger seat, the rear seat on the driver side, and the rear seat on the passenger side. The controller 21 may further monitor with an in-vehicle camera or seating sensor whether luggage is placed in the center of the rear seat.

In a case in which the vehicle 10 is a seven-seater to nine-seater vehicle, the controller 21 monitors whether an occupant is seated in the driver seat, the passenger seat, the second and third row rear seats on the driver side, and the second and third row rear seats on the passenger side of the vehicle 10, as a usage, using an in-vehicle camera or seating sensors. The controller 21 may further monitor with an in-vehicle camera or seating sensor whether an occupant is seated in the center of the second row, third row, or both rear seats. The controller 21 may use an in-vehicle camera or seating sensors to monitor whether luggage is placed in the driver seat, passenger seat, second and third row rear seats on the driver side, and second and third row rear seats on the passenger side, respectively. The controller 21 may further monitor with an in-vehicle camera or seating sensor whether luggage is placed in the center of the second row, third row, or both rear seats.

In S2, the controller 21 sets the reference distance on each of the driver side and the passenger side, respectively, according to the usage of each seat on the driver side and the passenger side. In a situation in which no driver is seated in the driver seat, the controller 21 may wait until it detects a situation in which a driver is seated in the driver seat, since there is no need to execute steps S2 and beyond.

Specifically, in a case in which the vehicle 10 is a two-seater vehicle, the controller 21 sets the reference distance DA on the driver side based on the protruding length LA of the door 11A of the driver seat when having the minimum opening degree required for the driver to get out. For example, the controller 21 sets the reference distance DA on the driver side to the same distance as the protruding length LA. The protruding length LA may be preset as a fixed value or calculated dynamically according to the physique of the driver. Upon detecting a situation in which an occupant is seated in the passenger seat, the controller 21 sets the reference distance DB on the passenger side based on a protruding length LB of the door 11B of the passenger seat when having the minimum opening degree required for the occupant to get out. For example, the controller 21 sets the reference distance DB on the passenger side to the same distance as the protruding length LB. The protruding length LB may be preset as a fixed value or calculated dynamically according to the physique of the occupant. In the case of determining that the occupant seated in the passenger seat is a child, the controller 21 may set the reference distance DB on the passenger side based on a protruding length LBm of the door 11B of the passenger seat when having the maximum opening degree. For example, the controller 21 may set the reference distance DB on the passenger side to the same distance as the protruding length LBm. In the case of detecting a situation in which luggage is placed in the passenger seat, the controller 21 may set the reference distance DB on the passenger side based on a protruding length LBb of the door 11B of the passenger seat when having the minimum opening degree required for the luggage to be unloaded. For example, the controller 21 may set the reference distance DB on the passenger side to the same distance as the protruding length LBb. The protruding length LBb may be preset as a fixed value or calculated dynamically according to the size of the luggage.

In a case in which the vehicle 10 is a four-seater or five-seater vehicle, upon detecting a situation in which no occupant is seated in the rear seat on the driver side, the controller 21 sets the reference distance DA on the driver side based on the protruding length LA, as in the case in which the vehicle 10 is a two-seater vehicle. Upon detecting a situation in which an occupant is seated in the rear seat on the driver side, the controller 21 sets the reference distance DA on the driver side based on the protruding length LA and a protruding length LCm of the door 11C of the rear seat on the driver side when having the minimum opening degree required for the occupant to get out. For example, if LA<LCm, the controller 21 sets the reference distance DA on the driver side to the same distance as the protruding length LCm. If LA=LCm or LA >LCm, the controller 21 sets the reference distance DA on the driver side to the same distance as the protruding length LA. The protruding length LCm may be preset as a fixed value or calculated dynamically according to the physique of the occupant. In the case of determining that the occupant seated in the rear seat on the driver side is a child, the controller 21 may set the reference distance DA on the driver side based on the protruding length LA and a protruding length LC of the door 11C of the rear seat on the driver side when having the maximum opening degree. In the example illustrated in FIG. 2, since LA<LC, the controller 21 sets the reference distance DA on the driver side to the same distance as the protruding length LC. If LA=LC or LA>LC, the controller 21 sets the reference distance DA on the driver side to the same distance as the protruding length LA. In the case of detecting a situation in which luggage is placed in the rear seat on the driver side, the controller 21 may set the reference distance DA on the driver side based on the protruding length LA and a protruding length LCb of the door 11C of the rear seat on the driver side when having the minimum opening degree required for the luggage to be unloaded. For example, if LA<LCb, the controller 21 sets the reference distance DA on the driver side to the same distance as the protruding length LCb. If LA=LCb or LA>LCb, the controller 21 sets the reference distance DA on the driver side to the same distance as the protruding length LA. The protruding length LCb may be preset as a fixed value or calculated dynamically according to the size of the luggage. Upon detecting a situation in which an occupant is seated in the passenger seat and no occupant is seated in the rear seat on the passenger side, the controller 21 sets the reference distance DB on the passenger side based on the protruding length LB, as in the case in which the vehicle 10 is a two-seater vehicle. Upon detecting a situation in which no occupant is seated in the passenger seat and an occupant is seated in the rear seat on the passenger side, the controller 21 sets the reference distance DB on the passenger side based on a protruding length LD of the door 11D of the rear seat on the passenger side when having the minimum opening degree required for the occupant to get out. For example, the controller 21 sets the reference distance DB on the passenger side to the same distance as the protruding length LD. The protruding length LD may be preset as a fixed value or calculated dynamically according to the physique of the occupant. In the case of determining that the occupant seated in the rear seat on the passenger side is a child, the controller 21 may set the reference distance DB on the passenger side based on a protruding length LDm of the door 11D of the rear seat on the passenger side when having the maximum opening degree. For example, the controller 21 may set the reference distance DB on the passenger side to the same distance as the protruding length LDm. In the case of detecting a situation in which luggage is placed in the rear seat on the passenger side, the controller 21 may set the reference distance DB on the passenger side based on a protruding length LDb of the door 11D of the rear seat on the passenger side when having the minimum opening degree required for the luggage to be unloaded. For example, the controller 21 may set the reference distance DB on the passenger side to the same distance as the protruding length LDb. The protruding length LDb may be preset as a fixed value or calculated dynamically according to the size of the luggage. The setting of the reference distance DB on the passenger side when a situation in which an occupant is seated in the passenger seat and an occupant is also seated in the rear seat on the passenger side is detected is the same as the setting of the reference distance DA on the driver side when a situation in which an occupant is seated in the rear seat on the driver side is detected, so the explanation is omitted. If the occupant in the passenger seat is determined to be a child, the protruding length LBm is applied instead of the protruding length LB. If a situation in which luggage is placed in the passenger seat is detected, the protruding length LBb is applied instead of the protruding length LB. If the center of the rear seat is further monitored in S1 to determine whether an occupant is seated in the center of the rear seat or whether luggage is placed there, the center of the rear seat may also be considered the rear seat on the driver side. In other words, two rear seats may be considered on the driver side.

In a case in which the vehicle 10 is a seven-seater to nine-seater vehicle, the number and arrangement of doors is generally the same as in the case in which the vehicle 10 is a four-seater or five-seater vehicle. Therefore, the setting of the reference distance DA on the driver side and the reference distance DB on the passenger side in the case in which the vehicle 10 is a seven-seater to nine-seater vehicle is the same as in the case in which the vehicle 10 is a four-seater or five-seater vehicle, except that there are two rear seats on the driver side and the passenger side respectively, so the explanation is omitted. If the center of the second row rear seat is further monitored in S1 to see if an occupant is seated or luggage is placed in the center of the second row rear seat, the center of the second row rear seat may also be considered as a rear seat on the driver side. In other words, at least three rear seats may be considered on the driver side. If the center of the third row rear seat is further monitored in S1 to see if an occupant is seated or luggage is placed in the center of the third row rear seat, the center of the third row rear seat may also be considered as a rear seat on the driver side. In other words, at least three rear seats may be considered on the driver side.

In step S3, the controller 21 determines whether the vehicle 10 is backing. If it is determined that the vehicle 10 is backing, i.e., the vehicle 10 is detected backing, the step of S4 is performed. If it is determined that the vehicle 10 is not backing, i.e., no backing of the vehicle 10 is detected, the step S1 is performed again.

Specifically, the controller 21 determines whether the shift lever of the vehicle 10 has been switched to R range. If the shift lever is switched to R range, step S4 is performed. If the shift lever is not in R range, step S1 is performed again.

In S4, the controller 21 acquires the image 31 of the rear of the vehicle 10 captured by the camera 30 in real time via the communication interface 23. The controller 21 outputs the acquired image 31 of the rear of the vehicle 10 to the display 40 in real time via the communication interface 23. Display 40 shows an image 31 of the rear of the vehicle 10 on the screen 41 to assist in backing the vehicle 10. The steps of S4 continue until the vehicle 10 has finished backing, such as when the shift lever is switched from R range to another range.

In S5, the controller 21 determines whether there is an obstacle on the side of a space 60 to which the vehicle 10 is predicted to proceed. If an obstacle is determined to be present, i.e., if an obstacle is detected, the step S6 is performed. If it is determined that there is no obstacle, i.e., no obstacle is detected, the flow illustrated in FIG. 6 ends.

Specifically, the controller 21 identifies the space 60 to which the vehicle 10 is predicted to proceed according to the steering angle of the steering wheel of the vehicle 10. The controller 21 determines whether there is an obstacle on the side of the space 60 corresponding to each of the driver side and the passenger side by analyzing the image 31 of the rear of the vehicle 10 acquired in S4 in real time. As an image analysis method, a known method can be used. Machine learning, such as deep learning, may be used. In the example illustrated in FIG. 3, the parked vehicle 50A is detected as an obstacle on the side of the space 60 corresponding to the driver side and the wall 50B is detected as an obstacle on the side of the space 60 corresponding to the passenger side. Step S6 is then executed.

In S6, the controller 21 displays, on the screen 41 that shows the image 31 of the rear of the vehicle 10, a guide element indicating the position that is distant from the obstacle detected in S5 by the reference distance set in S2.

Specifically, if an obstacle is detected on the side of the space 60 corresponding to the driver side in S5, the controller 21 generates the superimposed image by superimposing on the image 31 of the rear of the vehicle 10 a guide line 42A indicating, as a guide element on the driver side of the space 60, a position that is distant from the obstacle on the side of the space 60 corresponding to the driver side by the reference distance DA on the driver side. If the reference distance DB on the passenger side is set in S2 and an obstacle is detected on the side of the space 60 corresponding to the passenger side in S5, the controller 21 generates a superimposed image by superimposing on the image 31 of the rear of the vehicle 10, as a guide element on the passenger side of the space 60, a guide line 42B indicating a position that is distant from the obstacle on the side of the space 60 corresponding to the passenger side by the reference distance DB on the passenger side. The controller 21 outputs the generated superimposed image to display 40 in real time via the communication interface 23. Display 40 shows superimposed images on the screen 41 to assist in parking the vehicle 10. In the example illustrated in FIG. 4, as the guide line 42A, a line is displayed indicating a position that is distant from the parked vehicle 50A by the reference distance DA on the driver side, and as the guide line 42B, a line is displayed indicating a position that is distant from the wall 50B by the reference distance DB on the passenger side.

If a situation in which an occupant is seated in the rear seat on the passenger side is detected in S2 and an obstacle is detected on the side of the space 60 corresponding to the passenger side in S5, the controller 21 determines whether the distance from the obstacle to the space 60 on the side of the space 60 corresponding to the passenger side is shorter than the reference distance DB on the passenger side may be. In such a variation, when the controller 21 determines that the distance from the obstacle on the side of the space 60 corresponding to the passenger side to the space 60 is shorter than the reference distance DB on the passenger side, it outputs a message urging the occupant to get out of the rear seat on the driver side. For example, the controller 21 may display such a message on the screen 41 or output it audibly from the in-vehicle speakers.

The present disclosure is not limited to the embodiment described above. For example, two or more blocks described in the block diagram may be integrated, or a block may be divided. Instead of executing two or more steps described in the flowchart in chronological order in accordance with the description, the steps may be executed in parallel or in a different order according to the processing capability of the apparatus that executes each step, or as required. Other modifications can be made without departing from the spirit of the present disclosure.

The invention claimed is:

1. A backing assistance apparatus comprising a controller configured to:

monitor a usage of each seat on a driver side and a passenger side of a vehicle;

set a reference distance on each of the driver side and the passenger side according to the usage;

upon detecting an obstacle on a side of a space to which the vehicle is predicted to proceed when the vehicle is backing, display, on a screen that shows an image of a rear of the vehicle to assist in backing the vehicle, a guide element indicating a position that is distant from the detected obstacle by the reference distance; and upon detecting as the usage a situation in which a child is seated in a rear seat on the driver side of the vehicle, set a reference distance on the driver side based on a protruding length of a door of a driver seat of the vehicle when having a minimum opening degree required for a driver to get out and a protruding length of a door of the rear seat on the driver side when having a maximum opening degree.

2. The backing assistance apparatus according to claim 1, wherein the controller is configured to, upon detecting as the usage a situation in which an occupant is seated or luggage is placed in the rear seat on the driver side of the vehicle, set a reference distance on the driver side based on the protruding length of the door of the driver seat of the vehicle when having the minimum opening degree required for the driver to get out and a protruding length of the door of the rear seat on the driver side when having a minimum opening degree required for the occupant to get out or for the luggage to be unloaded.

3. The backing assistance apparatus according to claim 1, wherein the controller is configured to:

upon detecting as the usage a situation in which an occupant is seated in a rear seat on the passenger side of the vehicle, set a reference distance on the passenger side based on a protruding length of a door of the rear seat on the passenger side when having a minimum opening degree required for the occupant to get out; and upon detecting the obstacle on a side of the space corresponding to the passenger side when the vehicle is backing and determining that a distance from the obstacle to the space is shorter than the reference distance on the passenger side, output a message urging the occupant to get out of the rear seat on the driver side of the vehicle.

4. A vehicle comprising:

a camera configured to capture the image; and the backing assistance apparatus according to claim 1.

5. A backing assistance apparatus comprising a controller configured to:

monitor a usage of each seat on a driver side and a passenger side of a vehicle;

set a reference distance on each of the driver side and the passenger side according to the usage;

upon detecting an obstacle on a side of a space to which the vehicle is predicted to proceed when the vehicle is backing, display, on a screen that shows an image of a rear of the vehicle to assist in backing the vehicle, a guide element indicating a position that is distant from the detected obstacle by the reference distance;

upon detecting as the usage a situation in which an occupant is seated in a rear seat on the passenger side of the vehicle, set a reference distance on the passenger side based on a protruding length of a door of the rear seat on the passenger side when having a minimum opening degree required for the occupant to get out; and upon detecting the obstacle on a side of the space corresponding to the passenger side when the vehicle is backing and determining that a distance from the obstacle to the space is shorter than the reference distance on the passenger side, output a message urging the occupant to get out of a rear seat on the driver side of the vehicle.

\* \* \* \* \*